United States Patent
Karam

(10) Patent No.: US 8,122,266 B2
(45) Date of Patent: Feb. 21, 2012

(54) POWERED COMMUNICATIONS INTERFACE PROVIDING LOW-SPEED COMMUNICATIONS BETWEEN POWER-SOURCING EQUIPMENT AND POWERED DEVICE IN NON-POWERED OPERATING MODE

(75) Inventor: Roger A. Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 624 days.

(21) Appl. No.: 12/268,560

(22) Filed: Nov. 11, 2008

(65) Prior Publication Data

US 2010/0117808 A1    May 13, 2010

(51) Int. Cl.
G06F 1/00 (2006.01)
G06F 1/26 (2006.01)
(52) U.S. Cl. ......... 713/300; 713/320; 713/323; 713/324
(58) Field of Classification Search .................. 713/300, 713/320, 323, 324
See application file for complete search history.

(56) References Cited

U.S. PATENT DOCUMENTS

| 7,299,368 B2 * | 11/2007 | Peker et al. ............... 713/300 |
| 7,426,374 B2 * | 9/2008 | Dwelley et al. ............ 455/127.1 |
| 7,849,333 B2 * | 12/2010 | Schindler ............... 713/300 |
| 2006/0082220 A1 | 4/2006 | Karam |
| 2006/0092000 A1 * | 5/2006 | Karam et al. ........... 340/310.11 |
| 2006/0100799 A1 * | 5/2006 | Karam ..................... 702/57 |
| 2008/0244284 A1 * | 10/2008 | Karam et al. ............ 713/300 |
| 2010/0042855 A1 * | 2/2010 | Karam ..................... 713/310 |
| 2010/0045302 A1 * | 2/2010 | Karam ..................... 324/539 |
| 2010/0095136 A1 * | 4/2010 | Karam ..................... 713/300 |

* cited by examiner

*Primary Examiner* — Brian Misiura
(74) *Attorney, Agent, or Firm* — BainwoodHuang

(57) ABSTRACT

A powered communications interface in a power-over-Ethernet (POE) system has a non-powered operating mode in which it withholds operating power from a powered device and applies relatively low signaling voltages and currents to the conductors of the Ethernet cable which include (a) first signaling voltages and currents of a detection/classification operation, and (b) second signaling voltages and currents of a low-speed communications operation by which the power-sourcing equipment and the powered device exchange operational information. The low-speed communications from the power-sourcing equipment to the powered device are conveyed by values and sequencing of the second signaling voltages, and low-speed communications from the powered device to the power-sourcing equipment are conveyed by values and sequencing of the second signaling currents conducted by the powered device in response to the second signaling voltages from the power-sourcing equipment. Frame-based communications protocols or lookup-table-based communications may be used.

22 Claims, 10 Drawing Sheets

POWERED COMMUNICATIONS INTERFACE PROVIDING LOW-SPEED COMMUNICATIONS BETWEEN POWER-SOURCING EQUIPMENT AND POWERED DEVICE IN NON-POWERED OPERATING MODE

BACKGROUND

The invention pertains to the field of powered communications interfaces via which power is provided to remote operating circuitry.

Powered communications interfaces are utilized in data communications systems to provide operating power to devices over the same wires used to carry data communications signals, in a manner analogous to the traditional telephone system in which DC operating power is provided to subscriber equipment over the twisted-pair telephone wires. Today, there is widespread use of so-called "power over Ethernet" or POE technology, in which DC operating power is provided to digital telephones, video cameras, and other data terminal equipment over unshielded twisted pair (UTP) cables connecting the data equipment with centralized data switches. In POE parlance, a device receiving power in this fashion is termed a "powered device" or PD, while a device that provides power for use by PDs is termed a "power sourcing equipment" or PSE.

According to applicable POE standards, a PSE must detect and classify a PD before PSE power is delivered to the PD. The PD presents a 25 kΩ signature resistor (R-signature) to a PSE to request the delivery of POE power. During the detection process, a PSE successively applies relatively low voltages V1 and V2 (less than 15 V) while measuring corresponding currents I1 and I2 conducted by the PD, then it calculates a resistance value R-signature=(V2−V1)/(I2−I1). If this calculation yields an R-signature in a suitable range about 25 kΩ (the valid identity network for a PD requesting power), the PSE proceeds to a classification process to ascertain the power requirements of the PD. The PSE applies a voltage in the range of 15v-20v while measuring the current drawn by the PD, and then uses the current value to classify the PD according to a set of values specified in the standard. Traditionally the standard allows 5 classes (labeled 0 to 4), and a more recent version of the standard allows for additional devices that require higher power than previously defined.

Conventionally, once detection and classification are complete, a PSE automatically applies full power (48 volts and a class-based maximum current) to the PD via the powered communication interface as long as the PSE has sufficient incremental power available to do so. The PD uses this POE power to operate. In many cases, the 48 V power is supplied to one or more DC-DC converters in the PD which transform the 48 V power into other specific operating voltages as required by the PD operating circuitry, such as ±15 V, +3.3 V, etc. In particular, the 48 V power is used to provide power to communications circuitry within the PD that effects high-speed data communications to/from the PD over the same twisted pairs used to carry the POE power. This circuitry is commonly referred to by the term PHY, referring to its "physical layer" communications functionality according to the well-known hierarchical description of data network communications.

US Patent Application Publication US 2006/0082220 A1 shows communications over a wired data telecommunications network between and among power sourcing equipment (PSE), powered devices (PDs), and the like which take place over the wired medium by modulating an inline power signal. Any suitable communications protocol may be used and any suitable modulation scheme can be used. Examples of information to be communicated include: changing power requirements or capabilities (higher or lower) and acknowledgements thereof (permitting finer power class gradation than available under existing standards); sensor data; wireless data converted to wired data; status signaling, and the like. Such communications may be used for a number of purposes including supporting redundant provision of services over a network.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
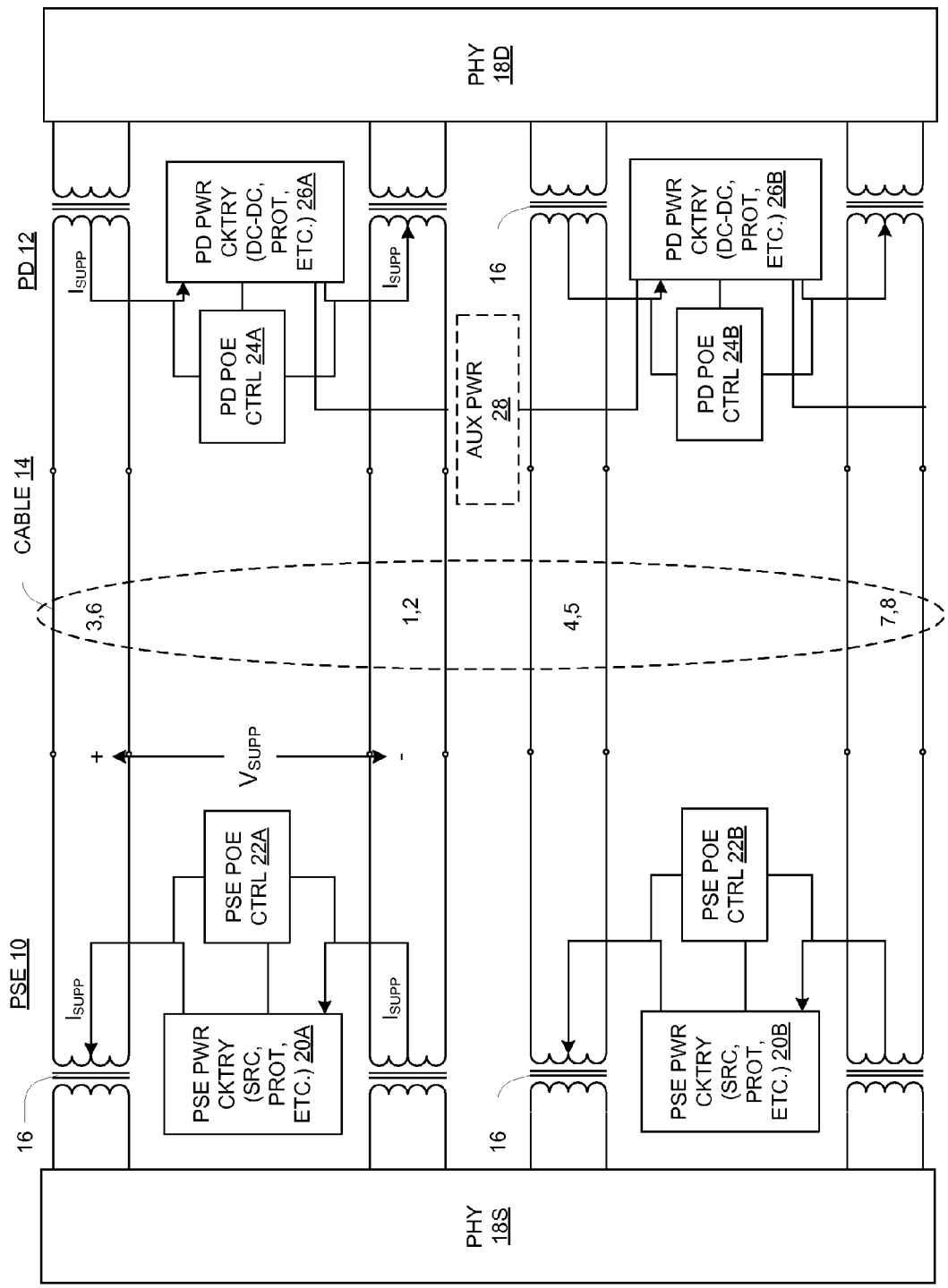
FIG. 1 is a block diagram of a system employing communications over a powered communications interface according to an embodiment of the invention.

In systems employing powered communications interfaces, such as POE systems, there can be a need for communications between a powered device (PD) and a power sourcing equipment (PSE) before the PD is receiving power from the PSE. As but one example particularly applicable to POE systems, the PSE may be operating in accordance with a power conservation policy such that under certain conditions it refrains from supplying power to a PD even when detection and classification indicate the presence of a valid PD that requires power. During such times when power is being withheld, it may be useful to enable the PD and the PSE to communicate with each other in at least a limited fashion, for example to enable the PD to inform the PSE that conditions have changed and the power-withholding operation should be terminated. However, such communications are generally not possible in traditional POE systems, because (1) the normal signaling that occurs in the absence of power is limited to detection and classification only, and (2) the circuitry that could be used for communications (such as PHY circuitry) is not receiving operating power, and therefore cannot be used for such signaling. Thus, traditional POE systems suffer from the inability to effect communications between a PD and a PSE when normal operating power is not being supplied to the PD via the powered communications interface.

A system and method are disclosed by which a PSE and a PD can engage in low-speed communications with each other via a powered communications interface when operating power is not being provided to the PD via the powered communications interface, enabling a variety of functions and applications that may otherwise be difficult or impossible to realize. Relatively low voltages and currents of the type used for detection and classification are used in an extended way to achieve the communications.

In particular, a power-sourcing equipment operates in both a powered operating mode and a non-powered, pre-operating mode. In the powered operating mode, the power-sourcing equipment supplies operating power to the powered device via coupling circuitry (such as transformers) in the form of a relatively high supply voltage across conductors of the cable and a relatively high supply current through the conductors of the cable. In this context, "relatively high" refers to voltages and currents at or near the normal supply voltage and current. In POE systems, this includes voltages within about 20% of 48 volts and currents at least 100% higher than those used for detection and classification.

In the non-powered operating mode, the power-sourcing equipment (1) withholds the POE operating power from the powered device, and (2) applies a sequence of relatively low signaling voltages and relatively low signaling currents to the conductors of the cable via the coupling circuitry, the sequence of relatively low signaling voltages and currents including (a) first signaling voltages and currents of a detection and classification operation by which the presence and power requirements of the powered device are detected, and (b) second signaling voltages and currents of a low-speed communications operation by which the power-sourcing equipment and the powered device exchange operational information outside of the normal powered operation of the powered device. Low-speed communications from the power-sourcing equipment to the powered device are conveyed by values and sequencing of the second signaling voltages, and low-speed communications from the powered device to the power-sourcing equipment are conveyed by values and sequencing of the second signaling currents which are conducted by the powered device in response to the second signaling voltages from the power-sourcing equipment. As shown in more detail below, the relatively low signaling voltages and currents are on the order of the voltages and currents used for detection and classification.

The low-speed communications operation is organized to provide a general communications channel between the PSE and PD. In one class of embodiments, frame-based communications are employed, with each communications frame having distinct frame start and frame end signals in addition to frame contents. Alternative techniques may utilize look-up tables and groupings of individual signaling bits into symbols to convey information.

Description of Example Embodiments

FIG. 1 illustrates a powered communications interface in the form of a four-pair Ethernet connection including circuitry supporting the delivery of both communications and power between a power-sourcing equipment (PSE) 10 and a powered device (PD) 12 over a cable 14. The cable 14 includes eight wires arranged as four twisted pairs, shown as pairs (3,6), (1,2), (4,5) and (7,8). In one common configuration, one set of two pairs (e.g. (3,6) and (1,2)) provides a first full-duplex high-speed communications channel, i.e., one pair of the set carries data in one direction while the other pair carries data in the opposite direction (10/100 baseT), and the other set of two pairs (e.g. (4,5) and (7,8)) provide a full-duplex high-speed communications channel to deliver 1000 baseT or higher speeds. Data is conveyed on each pair by differential signaling at high-speed rates such as 100 megabits per second, 1 gigabit per second, etc. Signal transformers 16 perform AC coupling of the data signals between the cable 14 and respective physical-layer (PHY) integrated circuits 18S, 18D.

Additionally, in the illustrated configuration each set of two pairs of wires also forms part of a respective first or second power-over-Ethernet (POE) power delivery channel. A first POE power delivery channel includes pairs (3,6) and (1,2) and their connected transformers 16 as well as PSE power circuitry (PSE PWR CKTRY) 20A, a PSE POE controller (PSE POE CTRL) 22A, a PD POE controller (PD POE CTRL) 24A, and PD power circuitry (PD PWR CKTRY) 26A. A second POE power delivery channel includes pairs (4,5) and (7,8) and their connected transformers 16 as well as PSE power circuitry 20B, PSE POE controller 22B, PD POE controller 24B, and PD power circuitry 26B. An auxiliary power source (AUX PWR) 28 (such as an external AC-DC converter) may be connected to one or both of the PD power circuitry 26A, 26B as shown.

The PSE power circuitry 20 of each power delivery channel includes various components that provide DC power to the PD 12 via the cable 14, specifically by generating a DC voltage Vsupp which is applied across the pairs of the channel via the center taps of the respective transformers 16, and a DC current Isupp which flows in pairs of the power delivery channel. The components of the PSE power circuitry 20, which are not specifically shown in FIG. 1, include a 48-volt DC power supply, a power field-effect transistor (FET) used as a switch to selectively couple or de-couple the 48-volt supply to/from the cable 14, a sense resistor for detecting the magnitude of current flow, etc. The PSE POE controller 22 of each power delivery channel includes control circuitry for controlling the operation of the associated PSE power circuitry 20 in accordance with POE specifications, as well as control circuitry that performs additional functions as specifically described herein.

Similarly, the PD power circuitry 26 of each power delivery channel includes various components that receive DC power from the PSE 10 via the cable 14 for use within the PD 12. Typical components (again not shown) include a DC-DC converter, protection circuitry, etc. For those PDs supporting an auxiliary power source 28, the PD power circuitry 26 typically also includes bridge circuitry that steers power from either the cable 14 or the auxiliary power source 28 to a powered circuit of the PD 12 while providing protection to avoid unsafe or potentially damaging currents. The PD POE controller 24 of each power delivery channel includes control circuitry that controls the flow of DC power from the cable 14 to the PD power circuitry 26 in accordance with POE specifications, as well as control circuitry that performs additional functions as specifically described herein.

While in FIG. 1 each set of pairs has its own autonomous PD POE controller 24, it will be appreciated that in an alternative arrangement it may be possible to use a single controller for both sets of pairs of a cable 14. Additionally, while in FIG. 1 the entire four-pair interface is described as a powered communications interface, in alternative embodiments a two-pair interface may constitute a powered communications interface. The signal transformers 16 constitute one type of coupling circuitry for coupling the data signals between the PSE 10 or PD 12 to/from the cable 14; other forms of coupling circuitry can be used.

There can be a need to detect and communicate with PD devices without applying POE voltages above 30 volts; such functionality may prove very useful for end users and network administrators alike. Communications improve the performance and capabilities of POE systems. There may be many applications for additional detections and communications. In one example involving a power-management strategy, there may be a need to shut down a PD 12 to save energy. This leaves such a device without its PHY-based communications, because the PHY 18D normally is provided operating power derived from the DC operating power represented by Vsupp and Isupp in FIG. 1. Support for communications and additional detections in this powered-off operating condition can enable an end-user to request power at will, especially when the PD 12 is powered down and is constantly presenting a valid 25 k identity network to an attached PSE. To implement such a "green-POE" policy (power down devices to conserve energy), the PSE 10 may be ordered to hold back its 48v POE power even while the PD 12 may be presenting a valid signature to the PSE 10. The order may be provided by some higher-level control mechanism such as system software, network administrator, etc. A user would preferably receive an indication about the status of the PD, i.e. that the PD 12 is visible to the PSE 10 and is powered down due to a green-POE policy, and in return the user is given the means to communicate back to the switch the need for modifying or overriding the policy. Also communication may be useful if a PD is powered from an auxiliary AC-DC converter and the converter requires network control in the event of a green policy power backoff implementation. The PD now serves as a communication circuit in the event that POE power is not enough to support local circuitry enabling both a low power redundant POE source and POE control over brick power backoff.

For purposes of this description, the result of a detection and/or classification is variously termed a "signature" or an "identity network". Both terms refer to the relationship between a voltage or voltages supplied by the PSE 10 and a corresponding current or currents conducted by the PD 12 (and supplied by the PSE 10). The PD can be said to present a different "signature" or "identity network" to the cable 14 by virtue of corresponding different currents supplied and measured by the PSE 10 at the same voltage or voltages. Standards also allow current based discovery where a current is supplied and voltage is measured across the center tap or a dedicated circuit at the PSE.

Figure 2:
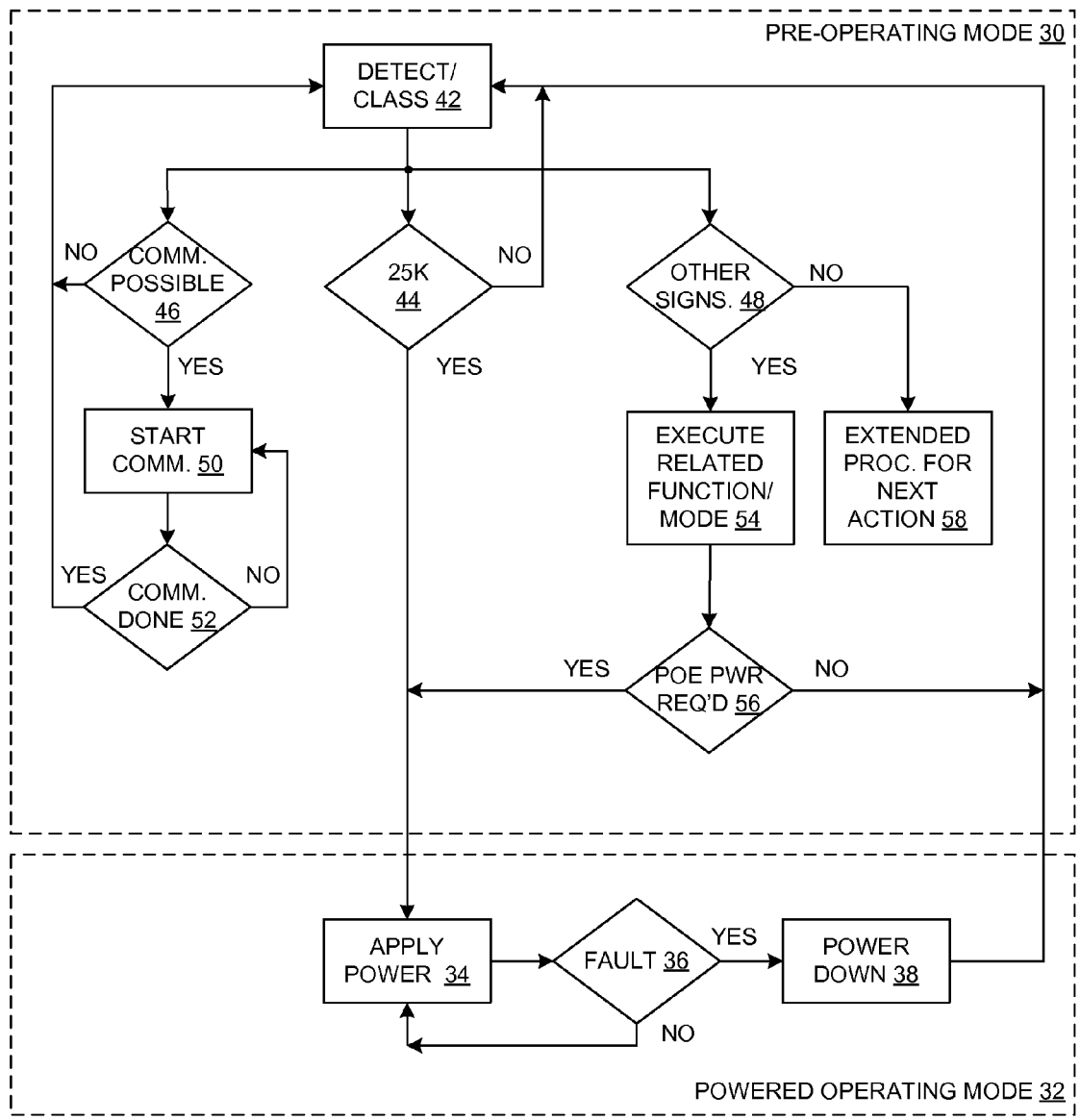
FIG. 2 is a flow diagram depicting a method of operation of the system of FIG. 1 according to a first embodiment.

FIG. 2 illustrates certain power-delivery operation of the circuitry of FIG. 1. Operation is shown as divided between a pre-operating mode (non-powered operating mode) 30 and a powered operating mode 32. In the powered operating mode 32, the PSE 10 utilizes the PSE power circuitry 20 and PSE POE controller 22 to provide DC power to the PD 12 via the cable 14, and the PD 12 utilizes the PD POE controller 24 and PD power circuitry 26 to receive the DC power and make it available for use within the PD 12 (e.g., by providing operating power to the PHY 18D). In the pre-operating mode 30, this DC operating power (also referred to herein as "POE power") is not being supplied. One important purpose of the pre-operating mode 30 is to test for certain conditions to determine whether it is safe for the PSE 10 to supply the DC operating power to the cable 14. For example, the PSE 10 tests for the presence of a 25 k resistor connected to the cable 14, which indicates whether the PD 12 is connected, and further tests for other circuit conditions that indicate a particular power class of the PD 12. Beyond these functions, the PSE 10 and PD 12 may engage in additional signaling for a variety of additional functions, examples of which are described more particularly below.

More specifically, in the powered operating mode 32, at step 34 the PSE 10 provides DC operating power to the PD 12 via the cable 14. Under these conditions the full 48 volt supply voltage Vsupp appears across the center taps of the transformers 16 of the power delivery channel, and a corresponding supply current Isupp is supplied to the power delivery channel as dictated by the load at the PD 12, subject to current limits and protections enforced by the PSE POE controller 22. While power is being supplied, the PSE 10 also checks for a fault condition as shown at 36. Examples of such fault conditions include an open-circuit or short-circuit condition. If no fault is detected, then power continues to be supplied at 34. When a fault condition is detected at 36, then at 38 the PSE 10 powers down the channel, i.e., disconnects the DC supply from the cable 14, and re-enters the pre-operating mode 30.

In the pre-operating mode 30, at step 42 the PSE 10 performs one or more detection and classification operations to determine (1) whether the PD 12 is connected to the cable 14, and (2) the power class of the PD 12 if connected. In the POE specifications, a detection consists of supplying at least two distinct DC voltages (V1, V2) of less than 30 volts to the cable 14, measuring the resulting currents (I1, I2), and performing a resistance calculation (V2−V1)/(I2−I1). In the classification operation, the PSE 10 supplies a voltage in the range of 15-20 volts and measures the resulting current. Different values of the current correspond to different classes of device with respect to the maximum amount of POE power drawn by the device. Under an original standard known as IEEE 802.3af, five classes were defined. Under a newer standard known as IEEE 802.3at, the number of classes is expanded and the classification operation involves the use of two successive classification voltages. The measured classification current is used to identify the power requirements of the PD 12 as specified in the standards.

At step 42, multiple detections and communications signals are enabled, and multiple checks are made at steps 44, 46 and 48 (may be made serially or in parallel). At step 44, the PSE 10 determines whether the result of the detection of step 42 corresponds to the 25 k resistive network specified in the standard (i.e., whether (V2−V1)/(I2−I1) is in an acceptable range around $2.5 \times 10^4$). If so, then the presence of the PD 12 is deemed to have been detected, and the PSE 10 enters the powered operating mode 32 to provide DC operating power to the PD 12. Otherwise, detection has failed and is simply repeated beginning again at 42.

At step 46 a detection is performed for an identity network with the potential to broadcast the availability of communication while checking for PD based signals for a start of communications. If the PD 12 is capable of communicating over the POE channel, interactive communications starts at 50 and while active, the communications mode checks for end of communications at 52 leading the PSE 10 back to detection at 42. At 42 detection continues, or the PSE 10 may opt to enter a different mode, apply power to attached devices, or take any other action based on the communications that just completed. During the communications, the checks of steps 44 and 48 may or may not be active.

At step 48, the PSE 10 is actively searching for different identity networks (which may be a 12.5 k resistor, another particular resistor value, or some other classification sequence or current). Also at 48 the PSE is searching for signals or special identity networks for identifying devices capable of communications at 46. The detection at step 48 may use non-standard or custom classification mechanisms and additional processing of the results of the 25 k discovery and the classification. For example, the dV/dI measurements may be analyzed further to search for different resistor values, and/or more classification cycles may be conducted and decoded. The nature of the detection and classification waveforms and pulses in voltage and time may change to deliver more results. When a valid identity network is found, then at step 54 a function or mode corresponding to the identity network is executed (including different protocols of communication modes, or entering other detection modes). Also, at 56 it is determined whether POE power is required, and if so then the powered operating mode 32 is entered. Optionally, extended processing is performed as shown at 58, where control may be passed back to firmware and the detection mode is exited. This firmware may be inside the POE controller. The firmware may apply power with a different voltage, turn on a security mode, restart detection in a different mode or take any action that is appropriate based on the detection results, including the detection of an identity network requiring an end to detections (a 'reset' of the detection mode signal).

In one type of embodiment, the PSE power circuitry 20 (FIG. 1) may be controlled to intentionally withhold power even when the PD 12 is presenting a valid 25 k signature resistor. This operation may be controlled by system software (for example) and may be utilized in furtherance of a power conservation scheme or some other goal. As a particular example, the system software may configure the PSE 10 to withhold power during particular (e.g., non-working) hours, or under other particular circumstances, in order to conserve power. The PSE 10 and PD 12 may employ signaling of the type described below, and this signaling can be used to influence the withholding of power (including an "override" such that power is provided notwithstanding that a power-withholding policy is in place, because the signaling indicates that a user of the PD 12 requires operating power, for example).

Figure 3:
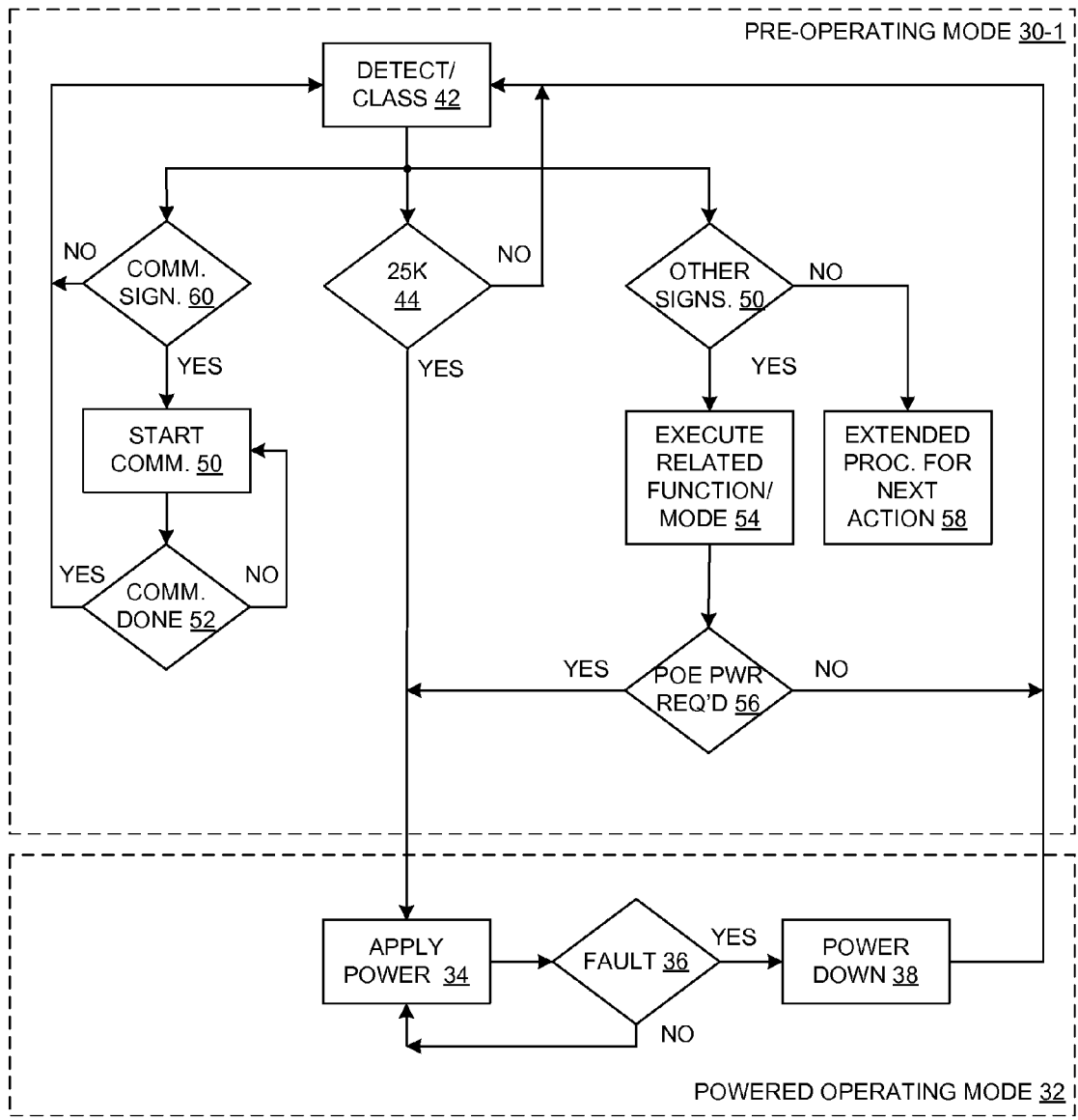
FIG. 3 is a flow diagram depicting a second method of operation of the system of FIG. 1 according to another embodiment.

FIG. 3 shows an alternative method that is similar to that of FIG. 2 except with respect to the detection of communications abilities. Additional detections are executed and communications are activated only when a valid detection of a special signal or identity network broadcasting the availability of support for one or more communications protocol is completed. Specifically, the search for an identity network or signature to start communications is activated at 60 or 50. It is worth noting that multiple identity networks may be used to start different communications protocols including the protocol used in FIG. 2 where detections and communications are concurrently active. And at 42, only detection is activated, no attempt for communications takes place. At 42, both a PSE and a PD may broadcast their ability to communicate using standard compliant signals or special signals and both may be capable of recognizing the presence of such features, at 50 and 60 detection for support of communication protocols may take place.

Figure 4:
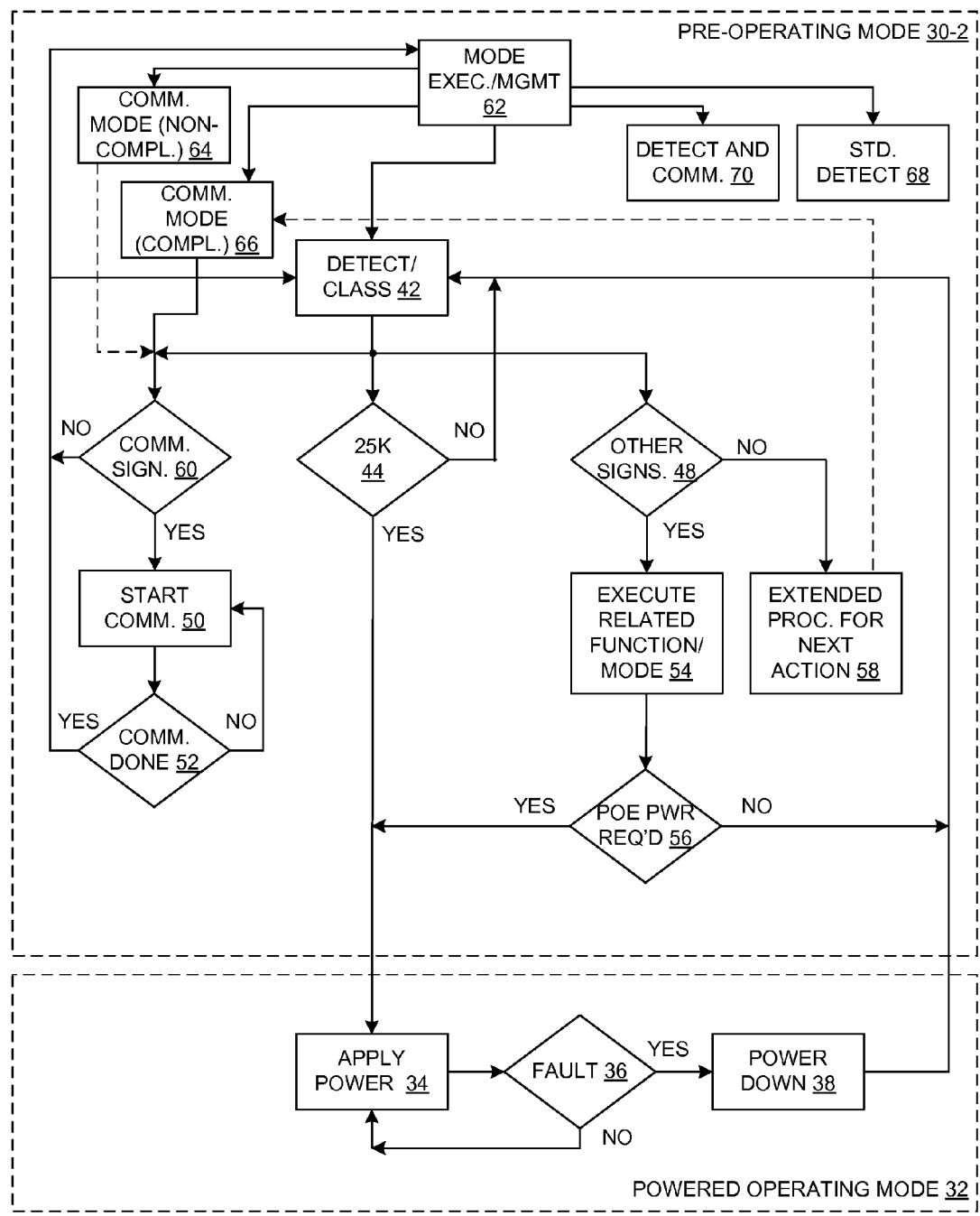
FIG. 4 is a flow diagram depicting a third method of operation of the system of FIG. 1 according to another embodiment.

FIG. 4 is a flow diagram for CPU control over the different detection, communication and detection/communication modes that may be possible in a PSE. A PSE may activate any mode at any time. A POE system of multiple PSE devices may activate any of the modes at any time. At step 62 control and management firmware is actively controlling what state the PSE 10 may have. Most of the time, the PSE 10 enables a mode and executes such mode indefinitely. In one mode, a standalone communications mode (non-standard compliant) may be activated at 64. Such activation may be based on the previous detection of an identity network. The fact that this mode is enabled does not imply successful communications. It is merely a way to signal and broadcast support for at least one communications protocol to attached devices. Once proper detections for support of the protocols among attached devices are done at 60, then communications may commence as described earlier. In addition, the return to 62 occurs at the end of communications at 52. Another standard-compliant mode of communications may be activated at 66 either during detections or in response to the detection of a special identity network as shown in the dotted line from step 58. A standard-compliant communications mode uses communications waveforms that comply with the specifications of published POE standards such as the IEEE 802.3af and 802.3at standards (communication signals may be embedded within compliant waveforms for example). Again, the fact that this mode is enabled does not imply successful communications. It is merely a way to signal and broadcast support for at least one communications protocol to attached devices. Once proper detections for support of said protocols among attached devices are done at 60, then communications may commence as described earlier. Yet another mode of detection may be enabled at 42, which has been described above. A simple, standard-compliant detection mode is shown at 68 and may be activated alone. At 70 a mode such as that of FIG. 2 above may be activated. Also, any additional modes that may be derivatives or combinations of these modes may also be included.

Figure 5:
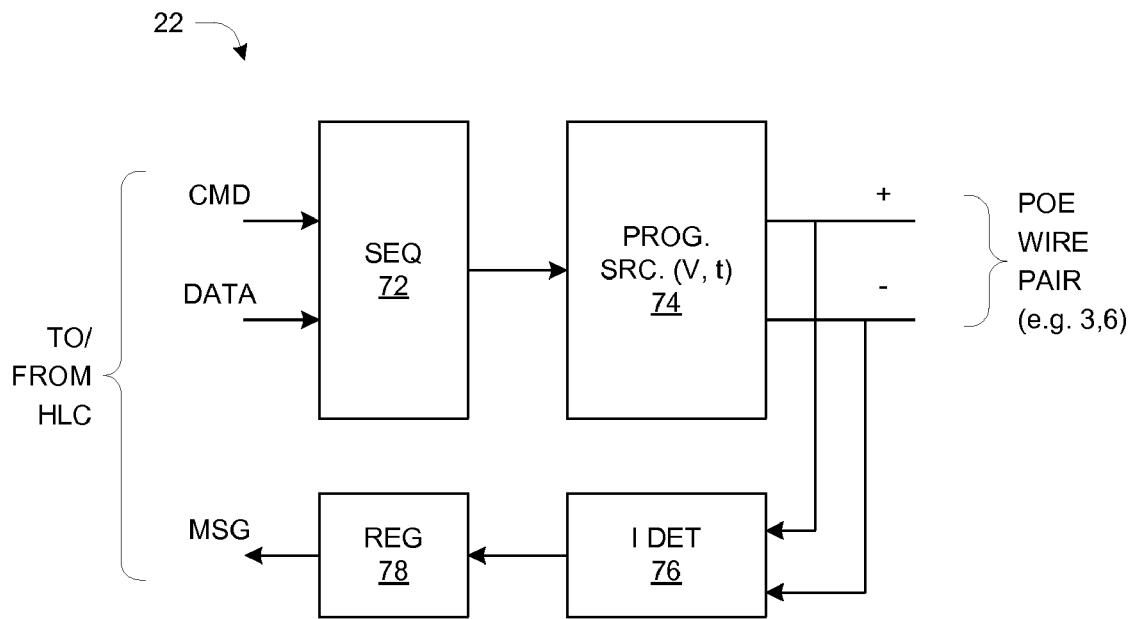
FIG. 5 is a block diagram of a power sourcing equipment (PSE) power controller.
Figure 6:
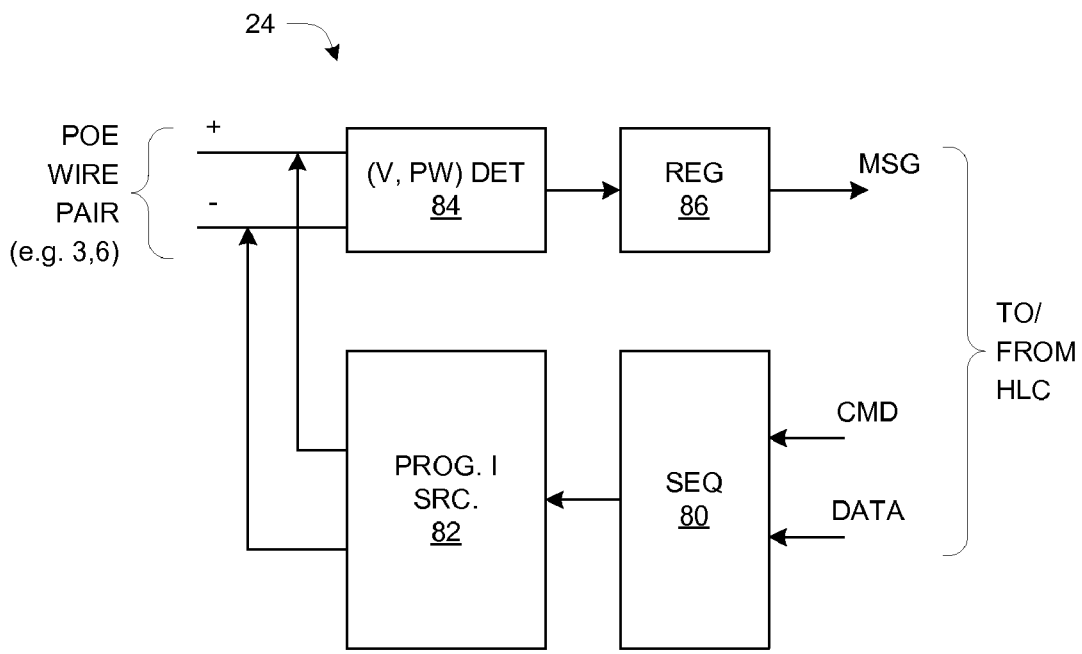
FIG. 6 is a block diagram of a powered device (PD) power controller.

FIGS. 5 and 6 show details of hardware that may be employed in the PSE POE controller 22 and PD POE controller 24, in particular to effect the signaling that is employed in the communications of step 50 of FIGS. 2-4. FIG. 5 shows the arrangement for the PSE POE controller 22. A sequencer (SEQ) 72 receives commands (CMD) and data from a higher-level controller (HLC) within the PSE 10, and generates corresponding control signals for a programmable source (PROG SRC) 74 that generates voltages (V, t) for specified time durations on the wire pair of the POE channel (e.g., pair 3,6 etc.). Also connected to the wire pair is a current detector (I DET) 76 that detects the magnitude of current on the wire pair and generates an output which is provided to a register (REG) or similar short-term storage device 78. The output of the register 78 is a message MSG provided back to the HLC of the PSE 10. The HLC may be any suitable controller (such as a microprocessor or microcontroller) that provides operational control over the PSE 10 or a sub-part thereof.

As shown in FIG. 6, the PD 12 has a somewhat analogous structure, including a sequencer 80, programmable current source (I SRC) 82, a voltage and pulse-width detector ((V,PW DET) 84, and register 86. The sequencer 80 receives commands and data from an HLC within the PD 12, and controls the programmable current source 82 to generate corresponding currents on the wire pair of the POE channel. The voltage and pulse width detection circuit 84 detects voltage pulses on the wire pair and generates corresponding messages that are stored in the register 86, whose output is a message MSG to the HLC.

Both PSE and PD controllers may have permanent memory.

Figure 7A:
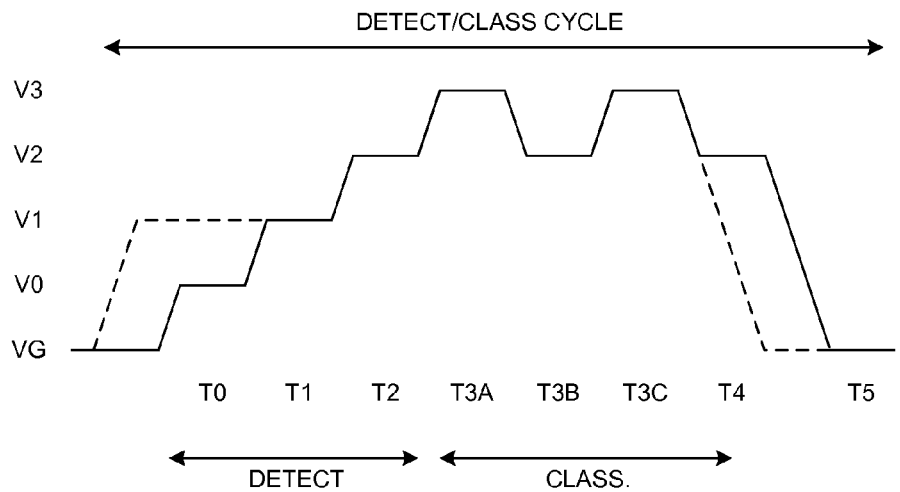
FIGS. 7(a) and 7(b) are waveform diagrams of detection/classification signals that can be used to signal communications capability.

Referring again to FIGS. 2-4, in order to accomplish the additional detections of steps 46, 48, etc., the PSE 10 may generate supplemental detection signals which may be entirely separate from the basic detection/classification signals or may be represented by certain modulation (either time or voltage) of the basic signals, and processes the measured returned current or signals in response to the modulations. FIG. 7(a) shows detection/classification signals including such a supplemental signal as an additional voltage of V2 at time T4 rather than an immediate return to VG (the latter operation indicated by the dotted line in FIG. 7(a)). In response to the presence of V2 at T4, the PD 12 may conduct a certain current value that corresponds to at least one additional identity network or signature which can be detected at step 46, 48, etc. This dwell at the voltage level starting at time T4 may be used to broadcast the presence of support for communication while enabling a PSE to remain standard compliant.

Figure 7B:
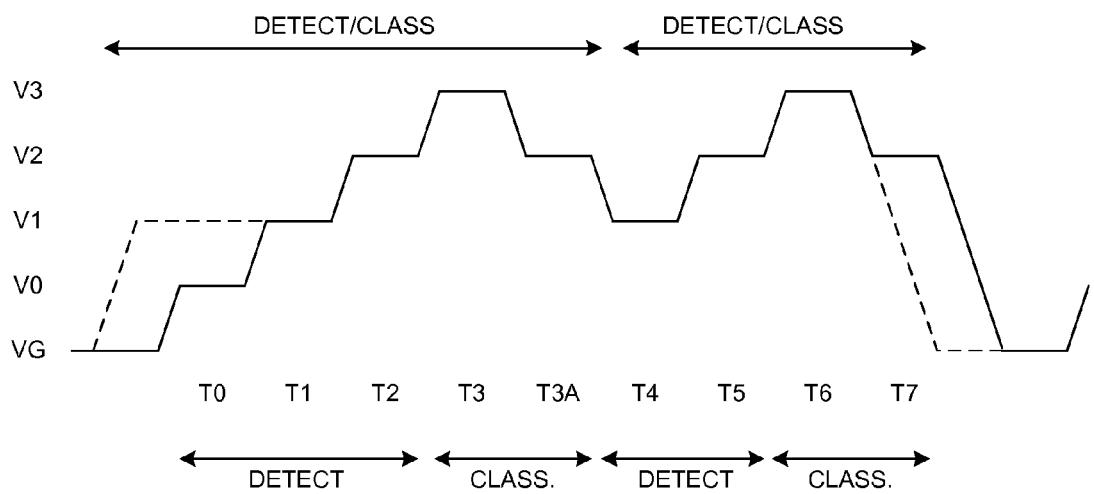

FIG. 7(b) shows a similar detection signal but employing two detect and class cycles, each having one classification cycle. While the signals of both FIGS. 7(a) and 7(b) enable a maximum of two classification cycles and are both compliant with standards, many additional classification cycles are possible to extract a large set of identity networks. For many applications, more than two classification cycles may be deployed, once an attached device requests the need for conducting such additional classification cycles via a compliant identity network discovery. The execution of multiple classification cycles presents a larger look-up table of possible identity networks. Such identity networks are not allowed for in the standards, and their extraction is now described briefly. The intent is to enable both a PD and a PSE to remain compliant with standards, interoperate with standard compliant devices, yet act differently when connected together to deliver enhanced functionality through communications.

For detection, standards call for applying a minimum of two voltage levels below 30 volts (e.g., V1 and V2 as shown, separated by at least two volts) and measuring the currents at each level. Such measurements enable a PSE to calculate the slope, or the resistance (Rsignature=dv/di) of the attached identity network resulting in a measurement of a resistor value. At the end of the detection process, classification is done either once or twice, where the voltage takes an excursion to a level between 15-20v (V3 as shown) and the current is measured. A look-up table is used to determine the class of the device based on the measured current value. In its simplest form this is the detect/classification mechanism according to the standards. Those skilled in the art will appreciate that the current actually conducted by the PD 12 in response to a given detect/class voltage can be measured in any of a variety of ways. One common configuration employs a sense resistor to develop a sense voltage proportional to the current, along with an analog-to-digital converter or comparators.

This same general mechanism can be employed for additional detections based on signals such as shown in FIGS. 7(a) and 7(b). The additional detections simply look for different values of current (and in some cases at different times) in response to applied voltages. In the example of FIG. 7(a), the PSE 10 is supplying a voltage V2 at time T4, and the PD 12 can respond with a corresponding current value that conveys meaningful information to the PSE 10 (e.g., whether the PD is communications capable at step 46, etc.). The PD 12 might supply a current of zero to indicate that it is not communications capable, for example, and a current of some predetermined number of milliamps to indicate that it is. The PSE 10 can measure the current the same way as it measures normal detection and classification currents, but the measurement is interpreted in accordance with whatever specific signaling scheme is being utilized for this expanded signaling.

For additional related description refer to related patent application entitled POWERED COMMUNICATIONS INTERFACE WITH PRE-OPERATING MODE USING LOW VOLTAGES AND CURRENTS FOR INFORMATION SIGNALING, Ser. No. 12/249,101, the contents of which are incorporated herein by reference.

With respect to the signaling of communications capability in particular, the PSE 10 may deploy any of several ways to signal its communications capability and to recognize a PD 12 capable of communication. The following are two examples:

1—The PD 12 can use a third classification cycle and the PD 10 can deliver a special classification current I-Class3 on the third classification cycle to signal its capability. The PSE 10 can modulate the duration of the third classification signal to signal its capability. For example, if the duration of the third classification signal is the same as the first two, it indicates that the PSE is not communications capable, whereas if the third classification signal has a longer or shorter duration, it indicates that the PSE is communications capable. This third classification cycle may be preceded with another classification cycle or simply 2 detect/class cycles.

2—The PSE 10 can use a knee voltage such as shown at T7 in FIG. 7(b) to dwell at the V2 voltage level in time. The PD 12 can measure the time (or both time and voltage) and know the PSE is capable of communications during the dwell, and the PD 12 can modulate its current to indicate it is communication enabled. This kind of mechanism may be the least intrusive to the standard detect/class mechanism.

Referring again briefly to FIGS. 2-4, step 50 refers to communications between the PSE 10 and PD 12 that is of a more general nature than what is described above. Such communications utilize structure and protocol to provide a general-purpose low-speed communications channel, enabling a richer exchange of information such as operational information (settings, status, etc). At the electrical level, the communications employs hardware mechanisms such as shown in FIGS. 5 and 6 to carry out specific electrical signaling, which is described in more detail below. However, the hardware also implements a higher-level logical structuring of the communications to achieve the more generalized channel.

For purposes of the structured communication between a PSE 10 and a PD 12, it is desirable for the communications from a PSE 10 to a PD 12 to exhibit some or all of the following capabilities:

1—Determine whether a PD is communication-capable
2—PSE communication start-signal
3—PSE communication end-signal
4—Address payload (e.g., 1 byte)
5—Data Payload (e.g., 1-byte)
6—Indicate whether message is response to a communication request from a PD
7—Give permission to a PD to start communication
8—Deliver a ready signal to acknowledge readiness for receiving data
9—Read-Back Signal
10—Write Signal (PD to store data being sent by PSE)
11—Inter-Frame Separator (e.g., a Next bit)
12—PD—reset signal And PSE—reset signal
13—PD in Listen mode (just write the data)

Similarly, for purposes of communications from a PD 12 to a PSE 10, capabilities such as the following are desirable:

1—Determine whether a PSE is communication-capable
2—PD communication start-signal
3—PD communication end-signal
4—Address payload
5—Data Payload
6—Indicate whether message is a response to a communication request from a PSE 7—Await a permission to start communication from a PSE 8—Deliver a Ready signal to acknowledge readiness for receiving data 9—Read-Back signal 10—Write Signal 11—PD stores information regarding any frame that was not sent/received properly It may be desirable that either/both of the PD 12 and PSE 10 communicate in either half duplex or full duplex if possible, and it may also be desirable to employ a simple error detection mechanism for greater integrity of the communications channel.

Figure 8:
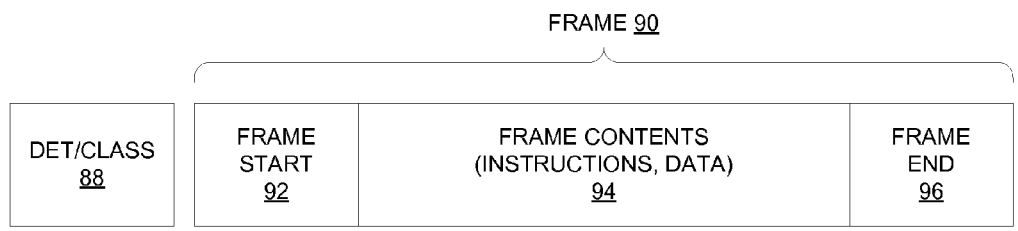
FIG. 8 is a schematic diagram of communications frame.

FIG. 8 shows a structure for low-speed communications operations on a POE channel. In this scheme, signals of relatively low voltages and currents, such as those used for detection and classification (DET/CLASS signals 88), are also organized into communications frames 90. A frame 90 includes a frame start signal 92, frame contents 94 and a frame end signal 96. The frame start signal 92 and frame end signal 96 have special electrical characteristics so that they can be readily distinguished, and the frame contents 94 are further organized as necessary to convey desired information. Specific examples are discussed below. In operation, the PSE 10 and PD 12 exchange frames 90 in order to exchange the messages and data included therein which pertain to system operation. It is believed that the disclosed communications mechanisms are capable of a variety of system-level uses, including configuration, monitoring, diagnostics, and similar kinds of system communications via which such kinds of operational information can be exchanged. However, the present disclosure focuses primarily on the communications mechanisms rather than on any particular use of these mechanisms for system functions. That is, protocols and message formats are described, but the use of specific messages in carrying out higher-level system functions is not. However, the following are but some of the examples of applications that might be enabled by use of the disclosed communications techniques:

1—Enabling a user password to be entered into a system before power is supplied to a powered device 2—Communications with an auxiliary DC power supply, commonly referred to as a "brick". Communications could enable the operation of the brick to be controlled from a remote network device, for example to selectively withhold and supply power as part of a power-conservation scheme.

3—Field failure analysis (communications can diagnose faults and store fault-related information even if normal operation at full supply power doesn't work)

4—Communication among multiple devices for redundancy

5—Some PD devices may not or need not have the Ethernet physical-layer (PHY) communications circuitry (e.g., phone chargers)—can still communicate with such devices for control etc.

6—Storing and retrieving security certificates (similar to #1 above), for example on a USB-like key without requiring Ethernet PHY circuitry and associated costs 7—Providing a redundant communication path (common mode) that can run on a single wire in a pair. If an Ethernet PHY circuit fails, a wireless mode or some special physical-layer mode (single pair communication) may be negotiated via the POE communication mode.

8—Enables the configuration of multiple devices sharing power over a single cable—a PSE can communicate with multiple devices on the same cable, and the devices can talk to each other via the PSE, while the PHY-layer connection remains point-to-point between a PSE and a PD.

Figures 9A, 9B:
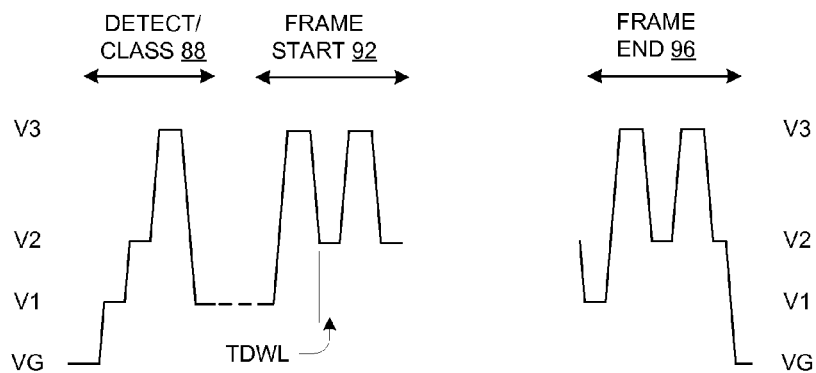
FIGS. 9(a), 9(b), and 9(c) are waveform diagrams of components of a communications frame.

FIGS. 9(a) and 9(b) show examples of the frame start signal 92 and frame end signal 96 respectively. The frame start signal 92 has two pulses both peaking at voltage V3 and returning to voltage V2. Note that the leading edge of the frame start signal 92 rises from V1 to V3. The frame end signal 96 is similar, with an initial drop to V1 followed by two pulses to V3, and the second pulse then returning to the ground voltage VG. These signals are generated by the PSE 10 exclusively, and thus the PSE 10 is exclusively in control of the communications in both directions between the PSE 10 and the PD 12. As explained below, the PSE 10 transmits information to the PD 12 by modulating the voltages it generates on the wire pair of the POE channel, and the PD 12 transmits information to the PSE 10 by modulating the current it conducts on the wire pair in response to the voltages generated by the PSE 10.

In the frame start signal 92 of FIG. 9(a), a dwell TDWL takes place at V2 (about 9 volts), and during this time the PD 12 may inform the PSE 10 of its communication capabilities by modulating its current, while the duration of this dwell tells the PD 12 that the PSE 10 is communication capable. This signaling corresponds to the step 46 of FIG. 2 for example. If both devices signal communications capability, then another classification cycle may be executed for a duration TDWL as a confirmation. While the voltage is shown to be constant for TDWL, it can also be decreasing in amplitude to emulate a time constant of the standard.

Figure 9C:
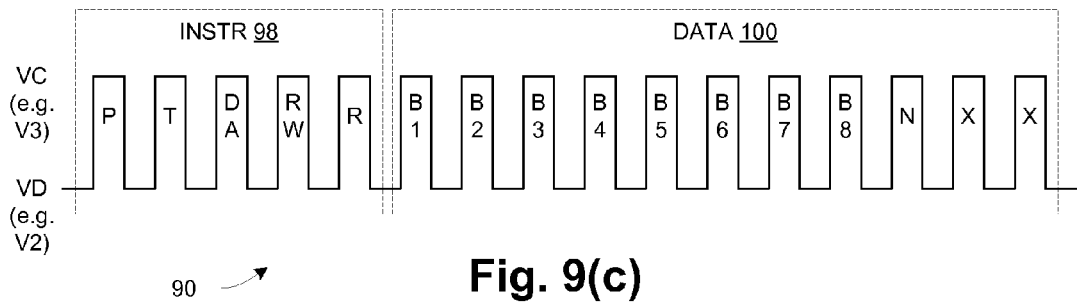

FIG. 9(c) shows an example of the frame contents 94, which are divided into instructions 98 and data 100. Each of these is a series of bit intervals defined by transitions between voltages VC and VD, which are specified below. Bit definitions are also provided below. Unlike the frame start signal 92 and frame end signal 96 which are conveyed by specific patterns of the voltages V1, V2 and V3 themselves, the pulse-like voltage signal of FIG. 9(c) may be only a carrier for the instruction and data bits which are conveyed by more subtle modulation of the signal. For communications from the PSE 10 to the PD 12, the PSE 10 may employ either voltage-amplitude, pulse-width (time) modulation to convey information or both. For communications from the PD 12 to the PSE 10, the PD 12 may employ current-amplitude modulation to convey information. Specific modulation techniques are described below.

Referring to FIG. 9(c), the bits of the frame 90 are designated as follows:

P—Parity (set to maintain even/odd parity across frame contents)

T—Talk (indicates whether PD can send data/address during data portion of frame)

DA—Data/address distinguisher (e.g., 1 means "data", 0 means "address")

RW—Read/write distinguisher (e.g., 1 means "read", 0 means "write")

R—Ready

B1-B8—data/address payload bits 1-8

N—Next bit (indicates that another frame will follow without intervening end/start signals. PSE uses this bit by modulating voltage, PD uses it by modulating current)

X—Don't care or reserved

In the scheme depicted above, the voltages V1 and V2 are defined to be below 10 volts and thus fall within the range of detection voltages specified in the 802.3 standard. V3 is the classification voltage as defined in the standard, $15v \leq v3 \leq 20v$. VC can be equal to V3 or can be set at a higher voltage such as 20v, 25v or 30v. VD is less than VC. For example, if VC=25v, then VD could be 20v or 17.5v. If VC=V3, VD could be 8-10v (just below the maximum of the detection range) for example.

The signaling rate (baud rate) of the communications is a function of a host of electrical factors including the minimum input capacitance at the input of the PD 12, the amount of PSE drive power, the magnitude of the PD load and other time constants. It is apparent that the maximum signaling rate cannot reach as high as the MHz region, as it is known today that classification signals have rise/fall times on the order of a few milliseconds and pulse widths up to about 10 milliseconds. If two frames can be sent in 50 milliseconds, that equates to two bytes of address/data bandwidth in 50 milliseconds. or about 320 bits per second of usable communication bandwidth. During a communication activity, power may be increased by the PSE driver to enhance speed.

In operation, the PSE 10 sends a frame start signal 92 followed by instruction bits 98, and the PD 12 responds by delivering a Ready signal during the R bit interval (see FIG. 9(c)). A simple form of a half/full duplex communication relies on a series of pulses such as shown in FIG. 9(c) to deliver a byte worth of address or data to a PD 12. The data/address bit DA may be used to inform the PD 12 that the payload is Data or Address, and the read/write bit RW signals whether the payload is for reading or writing. The talk bit T signals to the PD 12 that it must not modulate its current (i.e., just listen), forcing a half-duplex mode on.

Figure 10A:
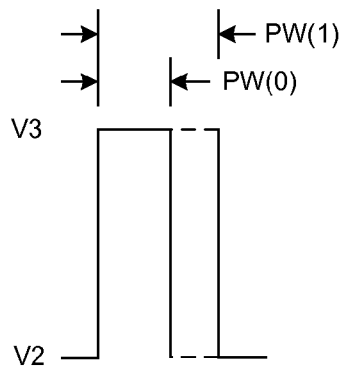
FIGS. 10(a) and 10(b) are waveform diagrams depicting modulation used for communications signaling.
Figure 10B:
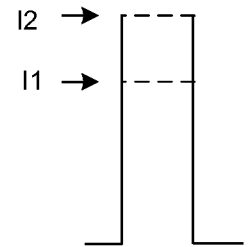

FIGS. 10(a) and 10(b) illustrate modulation that can be employed by the PSE 10 and PD 12 to transfer information to each other. FIG. 10(a) shows pulse-width modulation of the voltage signal generated by the PSE 10. Each voltage pulse has either a first pulse-width PW(0) signifying a binary 0 or a second pulse-width PW(1) signifying a binary 1. The durations of PW(0) and PW(1) can vary in different embodiments. An important consideration in selecting specific durations is to maintain the ability to distinguish a 0 from a 1 in the presence of expected noise. Typical values for PW(0) and PW(1) may be 10 msec and 20 msec respectively. Deviation to smaller and larger values would apply to adjust the capacity as needed.

FIG. 10(b) shows current-amplitude modulation that can be employed by the PD 12 transfer information to the PSE 10. In response to each voltage pulse from the PSE 10, the PD 12 responds with a current that has either a first amplitude I1 or a second amplitude I2, where I1 and I2 signify binary 0 and 1 respectively for example. Again, the specific amplitudes may vary, and consideration should be given to the PSE's ability to distinguish the two amplitudes in the presence of noise. Typical value of I1 and I2 may be 2 ma and 4 ma respectively in a standard compliant mode where 5 ma is the maximum current allowed, also it is worth noting here that once both the PSE and the PD negotiate the start of a communication session, such current may be increased to the 10's of ma.

Figure 11:
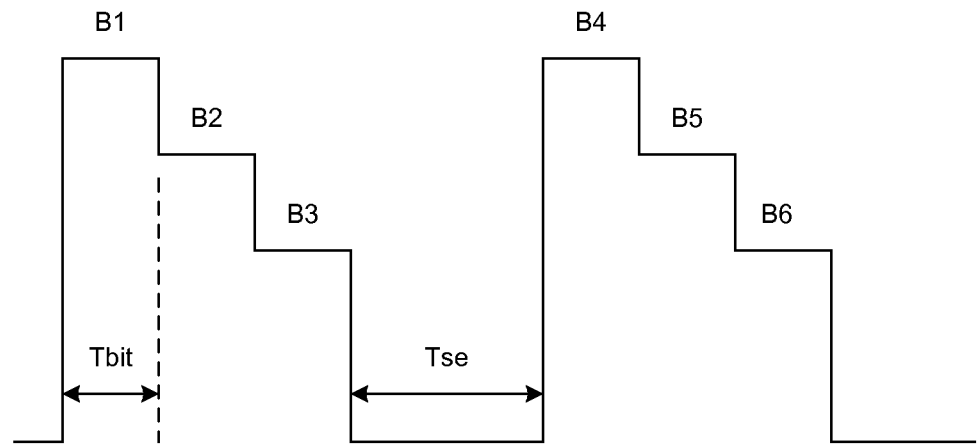
FIGS. 11-12 are waveform diagrams of alternative communications signaling schemes.

FIG. 11 illustrates an alternative signaling scheme that may be employed for communications between the PSE 10 and PD 12. Again it is assumed that the PSE 10 modulates the pulse-width of each bit time (shown as B1, B2, etc.), and that the PD 12 modulates the current it generates at each bit time. The illustrated technique is in the nature of a signal conversion scheme that directly converts values and sequence of signaling currents and/or voltages into usable information.

Table 1 below is a look-up table that can be used to enable the PSE POE controller 22 to decode three back-to-back resistance values (i.e., (B1, B2, B3) and (B4, B5, B6)). O stands for an Open, S stands for a short and 25 k stands for a resistance of 25 k ohms. If the PD 12 modulates its signature among these three values in connection with the communications of step 50 of FIGS. 2-4, then Table 1 can be used to convert groups of three signatures into ASCII, Binary, and symbols.

TABLE 1

| B1/B4 | B2/B5 | B3/B6 | ASCII | | BINARY |
|---|---|---|---|---|---|
| O | O | O | A | chr(65) | 01000001 |
| O | S | O | B | chr(66) | 01000010 |
| O | 25K | O | C | chr(67) | 01000011 |
| O | O | S | D | chr(68) | 01000100 |
| O | S | S | E | chr(69) | 01000101 |
| O | 25K | S | F | chr(70) | 01000110 |
| O | O | 25K | G | chr(71) | 01000111 |
| O | S | 25K | H | chr(72) | 01001000 |
| O | 25K | 25K | I | chr(73) | 01001001 |
| S | O | O | J | chr(74) | 01001010 |
| S | S | O | K | chr(75) | 01001011 |
| S | 25K | O | L | chr(76) | 01001100 |
| S | O | S | M | chr(77) | 01001101 |
| S | S | S | N | chr(78) | 01001110 |
| S | 25K | S | O | chr(79) | 01001111 |
| S | O | 25K | P | chr(80) | 01010000 |
| S | S | 25K | Q | chr(81) | 01010001 |
| S | 25K | 25K | R | chr(82) | 01010010 |
| 25K | O | O | S | chr(83) | 01010011 |
| 25K | S | O | T | chr(84) | 01010100 |
| 25K | 25K | O | U | chr(85) | 01010101 |
| 25K | O | S | V | chr(86) | 01010110 |
| 25K | S | S | W | chr(87) | 01010111 |
| 25K | 25K | S | X | chr(88) | 01011000 |
| 25K | O | 25K | Y | chr(89) | 01011001 |
| 25K | S | 25K | Z | chr(90) | 01011010 |
| 25K | 25K | 25K | y | chr(255) | 11111111 |

O = OPEN
S = Short

Another approach to a look-up table is to assign sequences of identity networks to binary group identities and symbols. Table 2 below shows the values 25 k, Open, Short and 12.5 k being grouped in sequences of three (as an example) to create unique symbols and unique binary sequences. Using this approach, two three-bit detection cycles can represent an 8-bit byte.

TABLE 2

| B1 ID Network | B2 ID Network | B3 ID Network | Group-Identity | Symbol |
|---|---|---|---|---|
| 25k | Open | 25k | 0000 | A1 |
| 25k | Short | 25k | 0001 | A2 |
| 12.5k | Open | 12.5k | 0010 | A3 |
| 12.5k | Short | 12.5k | 0011 | A4 |
| 25k | 12.5k | 25k | 0100 | A5 |
| 12.5k | 25k | 12.5k | 0101 | A6 |
| 25k | Open | Short | 0110 | A7 |
| 25k | Short | Open | 0111 | A8 |
| 12.5k | Open | Short | 1000 | A9 |
| 12.5k | Short | Open | 1001 | A10 |
| 25k | Open | 12.5k | 1010 | A11 |
| 12.5k | Open | 25k | 1011 | A12 |
| 25k | Other | 25k | 1100 | A13 |
| 12.5k | Other | 12.5k | 1101 | A14 |
| 25k | Other | 25k | 1110 | A15 |
| 25k | Other | Open | 1111 | A16 |

Each symbol may be assigned in a group of three symbols to constitute a sequence-identity as presented in Table 3 below, where an ASCII character is assigned for example to each group of three symbols.

TABLE 3

| Group Symbol 1 | Group Symbol 2 | Group Symbol 3 | Assigned Sequence-Identity |
|---|---|---|---|
| A1 | A1 | A1 | A |
| A2 | A2 | A2 | B |
| A3 | A3 | A3 | C |
| A4 | A4 | A4 | D |
| A5 | A5 | A5 | E |
| A6 | A6 | A6 | F |
| A7 | A7 | A7 | G |
| A8 | A8 | A8 | H |
| A9 | A9 | A9 | I |
| A10 | A10 | A10 | J |
| A11 | A11 | A11 | K |
| A12 | A12 | A12 | L |
| A13 | A13 | A13 | M |
| A14 | A14 | A14 | N |
| A15 | A15 | A15 | O |
| A16 | A16 | A16 | P |
| A1 | A1 | A2 | Q |
| A1 | A1 | A3 | R |
| A1 | A1 | A4 | S |
| A1 | A1 | A5 | T |
| A1 | A1 | A6 | U |
| A1 | A1 | A7 | V |
| A1 | A1 | A8 | W |
| A1 | A1 | A9 | X |
| A1 | A1 | A10 | Y |
| A1 | A1 | A11 | Z |
| A1 | A2 | A1 | 1 |
| A1 | A3 | A1 | 2 |
| A1 | A4 | A1 | 3 |
| A1 | A5 | A1 | 4 |
| A1 | A6 | A1 | 5 |
| A1 | A7 | A1 | 6 |
| A1 | A8 | A1 | 7 |
| A1 | A9 | A1 | 8 |
| A1 | A10 | A1 | 9 |
| A1 | A11 | A1 | 10 |
| A1 | A12 | A1 | @ |
| A1 | A13 | A1 | . |
| A1 | A14 | A1 | / |
| A1 | A15 | A1 | : |
| N . . . | N . . . | N . . . | N . . . |

Alternatively, groups of two symbols may be used to exchange one byte of binary data per the examples given in Table 4 below.

TABLE 4

| Group Symbol 1 | Group Symbol 2 | Binary | 1 - Byte |
|---|---|---|---|
| A1 | A2 | 0000 0001 | 00000001 |
| A2 | A3 | 0001 0010 | 00010010 |
| A1 | A16 | 0000 1111 | 00001111 |

At the PD 12, decoding takes place for a time or pulse-width at each voltage level. When three different bit times are chosen to modulate the time of each PSE voltage level (such as 25, 50 and 75 milliseconds), a table such as Table 5 below may be used. Please note that tables 3 and 4 above would still apply, once a symbol is defined it can be used in a similar manner.

TABLE 5

| B1 (msec) | B2 (msec) | B3 (msec) | Group-Identity | Symbol |
|---|---|---|---|---|
| 25 | 25 | 25 | 0000 | A1 |
| 25 | 25 | 50 | 0001 | A2 |
| 25 | 25 | 75 | 0010 | A3 |
| 50 | 50 | 50 | 0011 | A4 |
| 50 | 25 | 25 | 0100 | A5 |
| 50 | 25 | 75 | 0101 | A6 |
| 50 | 75 | 75 | 0110 | A7 |
| 75 | 75 | 25 | 0111 | A8 |
| 75 | 75 | 50 | 1000 | A9 |
| 75 | 75 | 75 | 1001 | A10 |
| 75 | 25 | 25 | 1010 | A11 |
| 75 | 25 | 50 | 1011 | A12 |
| 75 | 25 | 75 | 1100 | A13 |
| 75 | 50 | 25 | 1101 | A14 |
| 75 | 50 | 50 | 1110 | A15 |
| 75 | 50 | 75 | 1111 | A16 |

Figure 12:
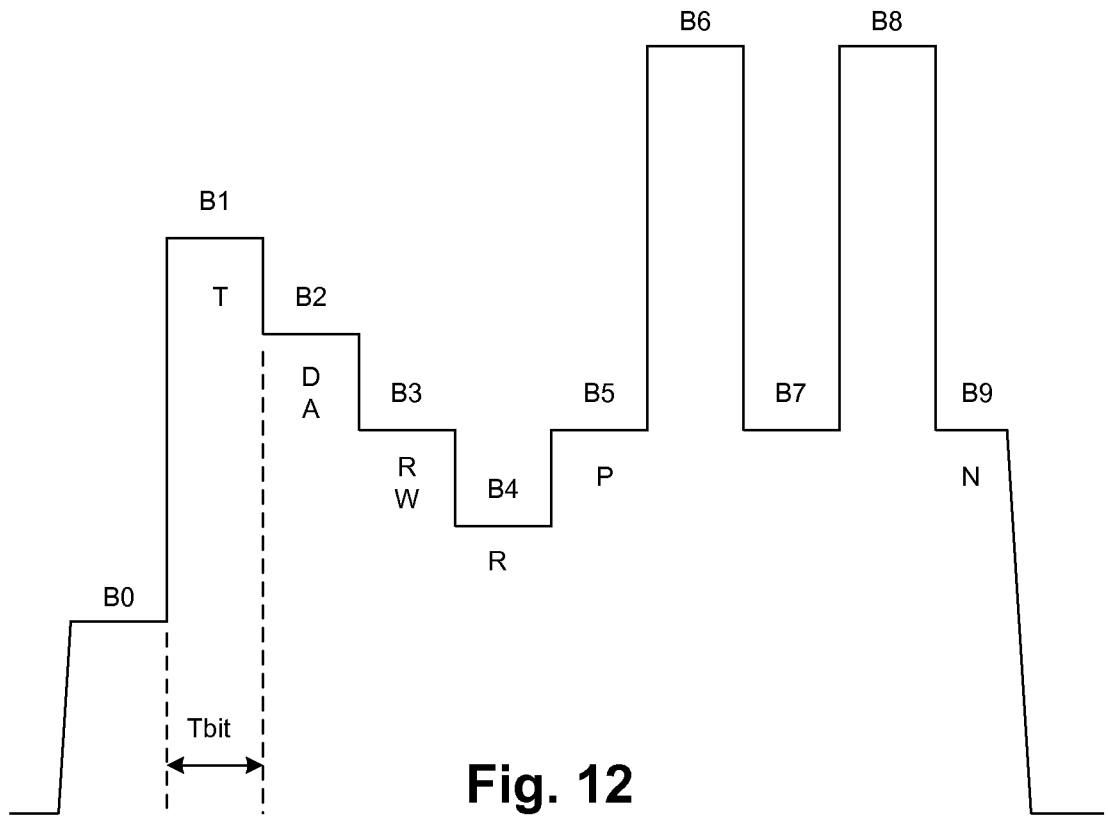

FIG. 12 illustrates another alternative that can provide several instruction bits as well as an 8-bit byte of data/address. The single pattern (frame) of FIG. 12 itself has 10 bits (labeled B0 through B9), with bits B1-B5 and B9 having the functions of the Talk, Data/Address, Read/Write, Ready, Parity and Next bits described above. This frame can be followed by one or more similar frames in which the bits B1-B8 are designated as address/data bits. The N bit is used to connect the frames together. For example, if messages are arranged as sets of two succeeding frames (the first for instructions and the second for data/address), then the N bit of the first frame has a value indicating that another frame follows, whereas the N bit of the second frame does not. If messages have three frames (one instruction followed by two data/address), then the N bit in the first two frames will be asserted and the N bit in the last frame de-asserted. More generally, the N bit in all but the last frame of a sequence is asserted. Specific ways of signaling the N bit are shown below. An instruction frame can be followed by one or more data/address frames (using the N bit to indicate when a sequence ends), or there can be one instruction frame preceding every data/address frame.

Figure 13:
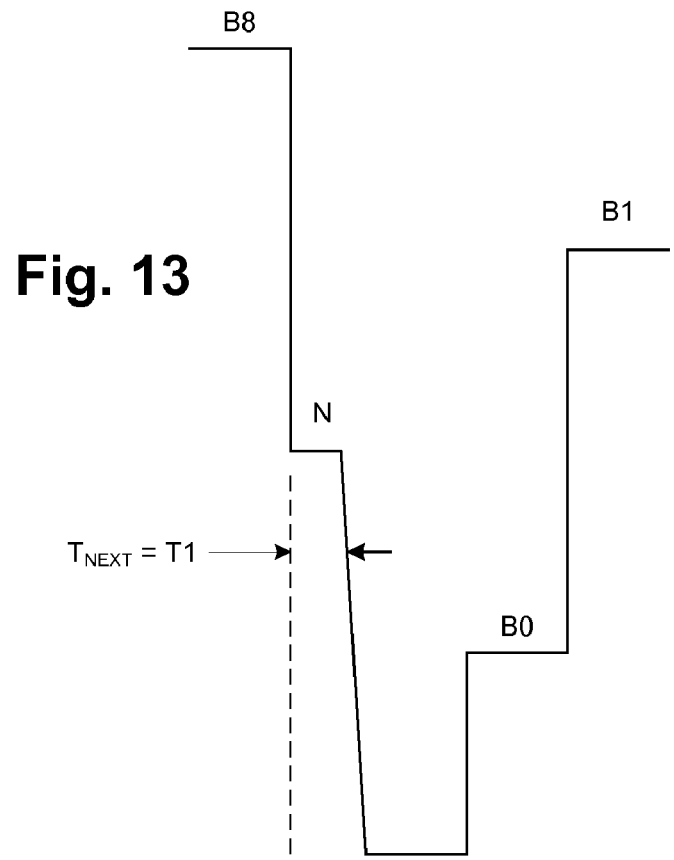
FIGS. 13 and 14 illustrate details of a Next bit used in the scheme of FIG. 12.
Figure 14:
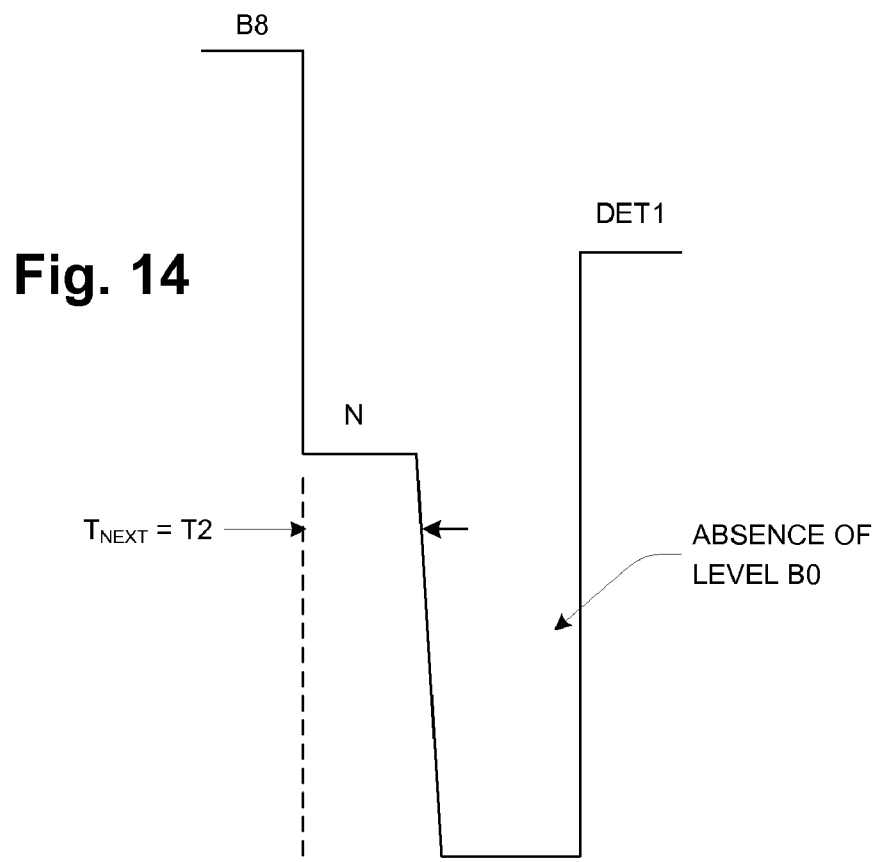

FIGS. 13 and 14 show the details of the start and end of frames and communications in the scheme of FIG. 12. FIG. 13 shows the end of one frame and the beginning of another. The Next bit has an asserted value, indicated by its duration of a first time T1. The beginning of the next frame has a momentary dwell at a voltage level during B0 and then a rise to a higher level at B1. This same transition is used at the beginning of all communications frames, including the very first one of a sequence (refer to FIG. 12). FIG. 14 shows the Next bit having a de-asserted value, indicated by its duration of a second, longer time T2. Also, communications have ended and therefore the next sequence is a regular detection sequence rather than part of a communications frame. This is indicated by (1) the de-assertion of Next, and (2) the absence of the level B0.

There may be several alternatives to the specific signaling formats of FIGS. 11 and 12. In particular, in FIG. 12 the bits B6 and B8 correspond to two classification-level voltages, which is utilized in the newer 802.3at standard. It would be possible to use only one such classification-level signal, and this would be consistent with the older 802.3af standard. It may also be possible to use no classification-level signals at all (limiting all signals to the range of detection signals).

While the above assumes that during each bit interval Bx only one bit of information (either instruction or data/address) can be conveyed, it may be possible to convey multiple bits per interval. This can be accomplished by using more than two signal levels, for example, or by using multiple forms of modulation simultaneously. In particular, the PSE 10 might use both pulse-width and voltage-amplitude modulation simultaneously, with one representing the instruction information and the other representing the data/address information. To convey more than one bit per interval from the PD 12, the PD might modulate its current among four values rather than only two, for example.

The communications techniques described above can handle point-to-point or two-device communications. If more than two devices are to communicate over a single cable, a special protocol is needed. Described below are enhancements to the disclosed communications protocols that enable one PSE 10 to communicate with two PDs 12. It should be noted that in such an arrangement, communications between the two PDs can be accomplished via the PSE.

Figure 15:
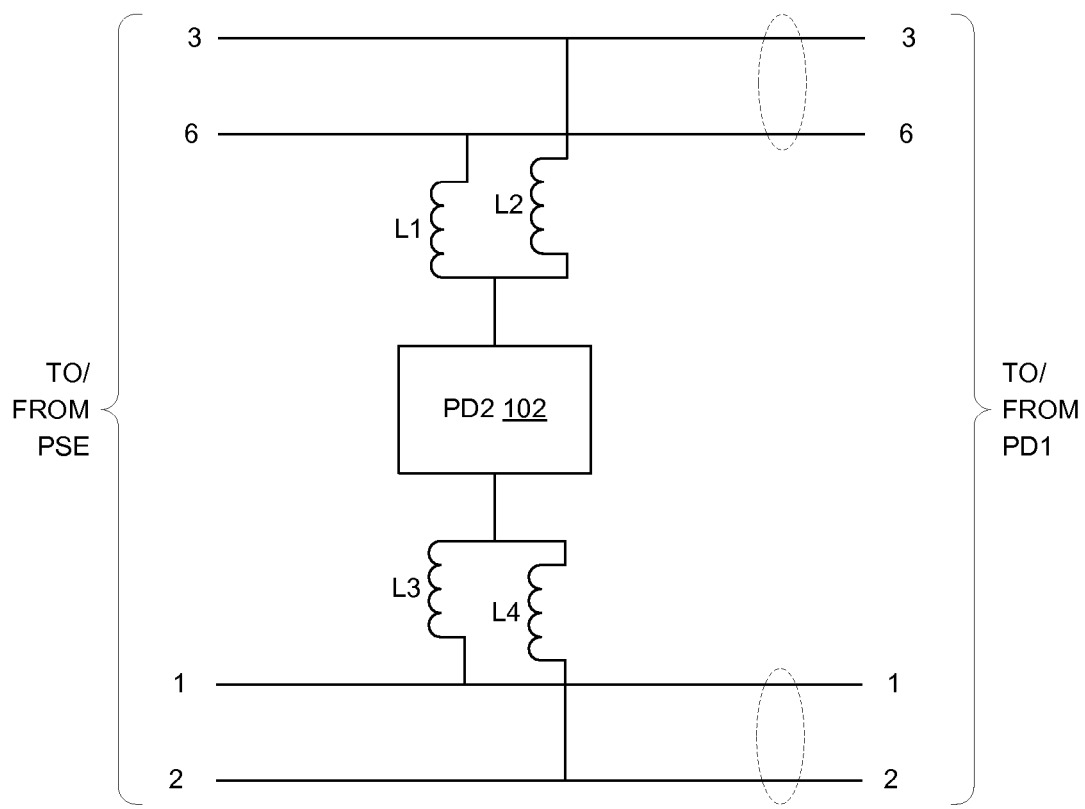
FIG. 15 is a block diagram showing a second PD connected to a communications link between a PSE and a first PD.

FIG. 15 illustrates a potential arrangement. A device identified as PD1 has the normal connections to the wire pairs, such as via an RJ45 plug/jack etc. A second PD, PD2 102, can be tapping inline power via inductors L1-L4 as shown. During communications, frames generated by the PSE 10 are received by both PD1 and PD2, so there is a need to identify either/both as the intended recipient. It is also necessary to identify which PD is given permission to transmit frames by supplying modulated current to the wire pairs of the POE channel. These requirements can be met in a variety of ways. One approach is to add one or more PD identifier (ID) bits to the instruction part of the frame. The PSE sets these bits to identify which PD is the intended target of the communications. As example, two ID bits may be used as follows:

| ID bits | PD |
|---------|----|
| 0 0 | unused |
| 0 1 | PD 1 |
| 1 0 | PD 2 |
| 1 1 | Broadcast (both PDs) |

The "broadcast" ID pattern is used for transmissions from the PSE 10 to both PDs 12.

Since communication among two or more devices may occur over a single cable in the POE domain (unlike the one to one Ethernet Data connection capability of Ethernet PHYs), a PSE would need to manage communications among two or more PD devices attached to said PSE. The PSE acting as a data switch, giving each device the permission to talk, and delivering the data to right PD using device addresses enables more devices to exchange information using the PSE as a switch, similar modification of the frame consisting of a device source and destination address may be implemented and modeled after Ethernet technologies.

This now enables data exchange at lower speed among multiple devices over one cable and via the switch where the PSE is among devices attached to multiple cables in the system where the PSE resides or across multiple systems.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a powered communications interface of a power-sourcing equipment, the powered communications interface including coupling circuitry operative to couple data signals between the power-sourcing equipment and conductors of a cable, the method comprising:
    in a powered operating mode, supplying operating power to a powered device via the coupling circuitry in the form of a relatively high supply voltage across the conductors of the cable and a relatively high supply current through the conductors of the cable; and
    in a non-powered operating mode, (1) withholding the operating power from the powered device, and (2) applying a sequence of relatively low signaling voltages and relatively low signaling currents to the conductors of the cable via the coupling circuitry, the sequence of relatively low signaling voltages and currents including (a) first signaling voltages and currents of a detection and classification operation by which the presence and power requirements of the powered device are detected, and (b) second signaling voltages and currents of a low-speed communications operation by which the power-sourcing equipment and the powered device exchange operational information outside of the normal powered operation of the powered device, wherein low-speed communications from the power-sourcing equipment to the powered device are conveyed by values and sequencing of the second signaling voltages and wherein low-speed communications from the powered device to the power-sourcing equipment are conveyed by values and sequencing of the second signaling currents which are conducted by the powered device in response to the second signaling voltages from the power-sourcing equipment.

2. A method according to claim 1, wherein the low-speed communications operation is selectively performed by the power-sourcing equipment in a first operating condition, and further comprising refraining from performing the low-speed communications operation and instead entering the powered operating mode in a second operating condition distinct from the first operating condition.

3. A method according to claim 2, wherein the first operating condition includes signaling by the powered device to the power-sourcing equipment that the powered device is capable of the low-speed communications operation, and the second operating condition includes the absence of signaling by the powered device to the power-sourcing equipment that the powered device is capable of the low-speed communications operation.

4. A method according to claim 3, wherein the signaling that the powered device is capable of the low-speed communications operation comprises generating a knee voltage in a detection/classification waveform and measuring a current as modulated by the powered device to determine whether the powered device is communication capable.

5. A method according to claim 1, wherein (1) the sequence of relatively low signaling voltages and relatively low signaling currents further include capability signaling voltage and capability signaling current by which the power-sourcing equipment determines whether the powered device is capable of the low-speed communications operation, and (2) the low-speed communications operation is performed only if the power-sourcing equipment determines based on the capability signaling voltage and capability signaling current that the powered device is capable of the low-speed communications operation.

6. A method according to claim 5, wherein the capability signaling voltage is backward compatible with powered devices that do not respond to the capability signaling voltage with the capability signaling current, and wherein the power-sourcing equipment interprets non-response to the capability signaling voltage as non-capability of the powered device to perform the low-speed communications operation.

7. A method according to claim 1, further comprising, as part of the low-speed communications operation, using a predetermined signal conversion scheme to convert values and sequencing of the second signaling currents into the operational information.

8. A method according to claim 1, wherein the values and sequencing of the second signaling voltages include pulse-width modulated voltages, and the values and sequencing of the second signaling currents include amplitude-modulated currents.

9. A method according to claim 8, wherein the values and sequencing of the second signaling voltages also include voltage-amplitude modulation of the pulse-width modulated voltages.

10. A method according to claim 8, wherein the amplitude-modulated currents include more than two modulation levels.

11. A method according to claim 1, further comprising applying the second signaling currents to a look-up table to identify corresponding information represented by the second signaling currents.

12. A method according to claim 11, wherein the second signaling currents are assigned to groups and symbols, the symbols being combinable into unique sequences representing corresponding information characters.

13. A method according to claim 1, wherein the low-speed communications is carried in frames, each frame including a frame start signal, a frame end signal, and frame contents, the frame contents of at least some frames including instructions, and the frame contents of at least some other frames including data.

14. A method according to claim 13, wherein the instructions include a talk bit whose value in a particular frame indicates whether the powered device is permitted to generate the second signaling currents to transmit information to the power-sourcing equipment.

15. A method according to claim 13, wherein (1) the powered device is a first of a plurality of powered devices coupled to the power-sourcing equipment by the conductors of the cable, and (2) the instructions include a powered device identifier identifying which one of the plurality of powered devices is the intended recipient of communications.

16. A method according to claim 15, wherein the low-speed communications operations include forwarding communications received from one of the powered devices to another of the powered devices.

17. A method according to claim 1, wherein the powered device is a first powered device and the power-sourcing equipment includes a second powered communications interface including second coupling circuitry operative to couple data signals between the power-sourcing equipment and conductors of a second cable to which a second powered device is coupled, and wherein the low-speed communications operations include forwarding communications received from the first powered device to the second powered device.

18. A method of operating a powered communications interface of a powered device, the powered communications interface including coupling circuitry operative to couple data signals between the powered device and conductors of a cable, the method comprising:
   in a powered operating mode, receiving operating power from a power-sourcing equipment via the coupling circuitry in the form of a relatively high supply voltage across the conductors of the cable and a relatively high supply current through the conductors of the cable; and
   in a non-powered operating mode during which the operating power is not being received from the power-sourcing equipment via the coupling circuitry, receiving a sequence of relatively low signaling voltages and generating relatively low signaling currents on the conductors of the cable via the coupling circuitry, the sequence of relatively low signaling voltages and currents including (a) first signaling voltages and currents of a detection and classification operation by which the powered device communicates its presence and power requirements to the power-sourcing equipment, and (b) second signaling voltages and currents of a low-speed communications operation by which the power-sourcing equipment and the powered device exchange operational information outside of the normal powered operation of the powered device, wherein low-speed communications from the power-sourcing equipment to the powered device are conveyed by values and sequencing of the second signaling voltages and wherein low-speed communications from the powered device to the power-sourcing equipment are conveyed by values and sequencing of the second signaling currents which are conducted by the powered device in response to the second signaling voltages from the power-sourcing equipment.

19. A power-sourcing equipment, comprising:
coupling circuitry operative to couple data signals between the power-sourcing equipment and conductors of a cable;
power circuitry coupled via the coupling circuitry to the conductors of a cable, the power circuitry being operable in a powered operating mode to supply operating power to a powered device via the conductors of the cable in the form of a relatively high supply voltage across the conductors of the cable and a relatively high supply current through the conductors of the cable; and
power control circuitry operative with the power circuitry in a non-powered operating mode to (1) withhold the operating power from the powered device, and (2) apply a sequence of relatively low signaling voltages and relatively low signaling currents to the conductors of the cable via the coupling circuitry, the sequence of relatively low signaling voltages and currents including (a) first signaling voltages and currents of a detection and classification operation by which the presence and power requirements of the powered device are detected, and (b) second signaling voltages and currents of a low-speed communications operation by which the power-sourcing equipment and the powered device exchange operational information outside of the normal powered operation of the powered device, wherein low-speed communications from the power-sourcing equipment to the powered device are conveyed by values and sequencing of the second signaling voltages and wherein low-speed communications from the powered device to the power-sourcing equipment are conveyed by values and sequencing of the second signaling currents which are conducted by the powered device in response to the second signaling voltages from the power-sourcing equipment.

20. A power-sourcing equipment according to claim 19, wherein the power control circuitry comprises:
   a programmable voltage source operative in response to control signals to generate the second signaling voltages on the conductors of the cable;
   a current detector operative to detect the second signaling currents on the conductors of the cable and generate corresponding a corresponding output; and
   a sequencer operative in response to commands and data from a higher level controller within the power-sourcing equipment to generate the control signals to the programmable voltage source to effect the exchange of the operational information between the power-sourcing equipment and the powered device.

21. A powered device, comprising:

coupling circuitry operative to couple data signals between the powered device and conductors of a cable;

power circuitry coupled via the coupling circuitry to the conductors of a cable, the power circuitry being operable in a powered operating mode to receive operating power from a power-sourcing equipment via the conductors of the cable in the form of a relatively high supply voltage across the conductors of the cable and a relatively high supply current through the conductors of the cable; and power control circuitry operative, in a non-powered operating mode in which the operating power is not being supplied to the powered device via the coupling circuitry, to receive a sequence of relatively low signaling voltages and generate relatively low signaling currents on the conductors of the cable via the coupling circuitry, the sequence of relatively low signaling voltages and currents including (a) first signaling voltages and currents of a detection and classification operation the powered device communicates its presence and power requirements to the power-sourcing equipment, and (b) second signaling voltages and currents of a low-speed communications operation by which the power-sourcing equipment and the powered device exchange operational information outside of the normal powered operation of the powered device, wherein low-speed communications from the power-sourcing equipment to the powered device are conveyed by values and sequencing of the second signaling voltages and wherein low-speed communications from the powered device to the power-sourcing equipment are conveyed by values and sequencing of the second signaling currents which are conducted by the powered device in response to the second signaling voltages from the power-sourcing equipment.

22. A powered device according to claim 21, wherein the power control circuitry comprises:

a voltage detector operative to detect the second signaling voltages on the conductors of the cable and generate corresponding a corresponding output;

a programmable current source operative in response to control signals to generate the second signaling currents on the conductors of the cable; and a sequencer operative in response to commands and data from a higher level controller within the powered device to generate the control signals to the programmable current source to effect the exchange of the operational information between the power-sourcing equipment and the powered device.

* * * * *